S. D. Gilson,

Salt Evaporator:

Reissued May 30 1871

4399

Witnesses:

Parker H. Sweet Jr.

W. J. Henderson

Inventor:

Samuel D. Gilson by his Attorney

James L. Norris

Washington, D.C.

UNITED STATES PATENT OFFICE.

SAMUEL D. GILSON, OF SYRACUSE, NEW YORK.

IMPROVEMENT IN APPARATUS FOR EVAPORATING SALT BRINES.

Specification forming part of Letters Patent No. 108,701, dated October 25, 1870; reissue No. 4,399, dated May 30, 1871.

*To all whom it may concern:*

Be it known that I, SAMUEL D. GILSON, of the city of Syracuse, county of Onondaga and State of New York, have invented a new and useful Improvement in Evapo ators; and I do hereby declare the following to be a full, clear, and sufficient description of the same, so as to enable any one skilled in the art to make, construct, and use the same, reference being had to the annexed drawing forming a part of this specification, in which—

Figure 1:
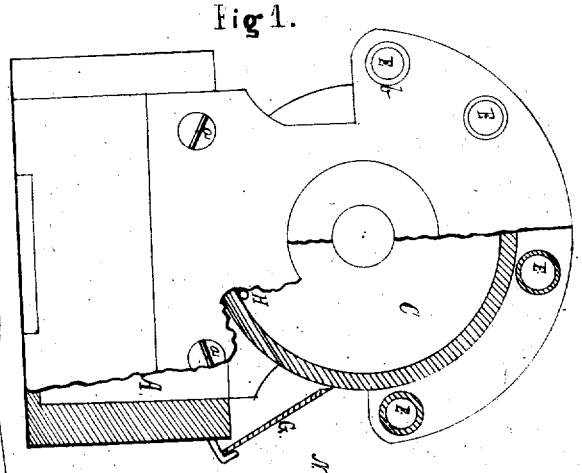
Figure 3:
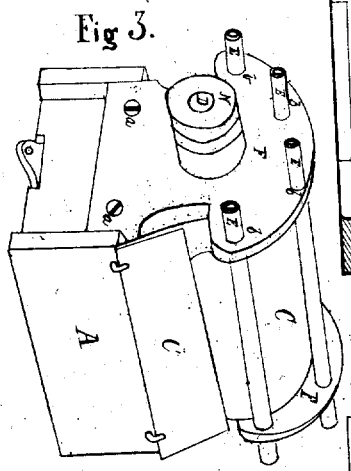
Figure 2:
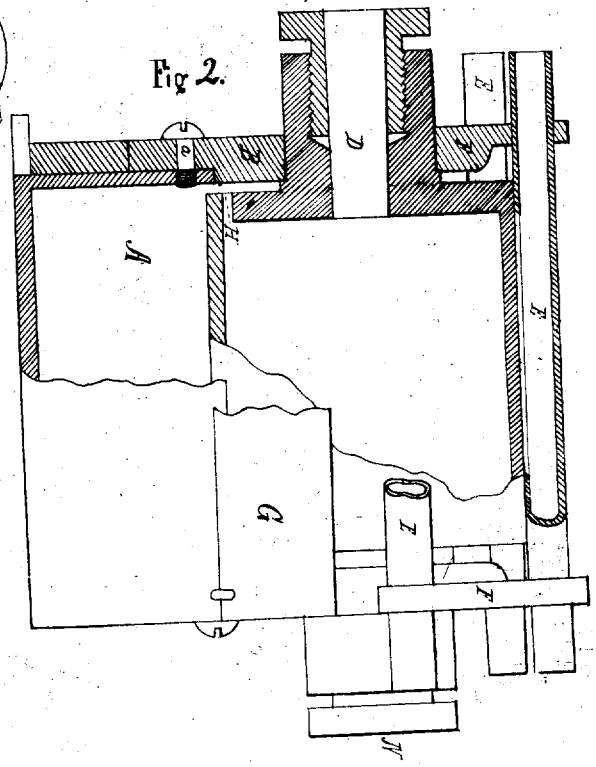
Figure 4:
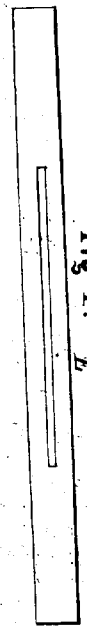

Figure 1 is an end view, partly in section, of the device illustrative of my invention. Fig. 2 is a side view thereof, partly in section. Fig. 3 is a perspective view. Fig. 4 is a view of one of the dripping-pipes, to be hereinafter referred to.

Similar letters of reference indicate corresponding parts in the several figures.

*Nature and Objects of this Invention.*

Heretofore the most successful method of making salt has been to evaporate the brine either in a series of kettles or a shallow reservoir by solar evaporation. This is the most economical and best method at present in use, but is uncertain in its results as to time, it being wholly dependent upon the dry state of the atmosphere. The boiling process or method is to some extent more certain in its results, but is unreliable, not removing the impurities that exist in the brine, and which, by overheating, form incrustations upon the kettles, which, owing to the difficulty experienced in removing the same, cause great delay, labor, and expenditure of heat, thus increasing the cost of fuel and waste of salt by such incrustation.

To overcome the uncertainty of the solar and the imperfections of the present artificial method of manufacturing salt is the object of my invention; and to this end the same consists essentially as follows: First, in the process or method of manufacturing salt by exposing or subjecting salt-water, as it is taken from the spring or otherwise obtained, to one or more cylinders, which are heated by steam, hot air, or water, said cylinder or cylinders revolving over a suitable tank, the surface or periphery of which touches the water essentially for the purpose of saturating the same—that is, to evaporate the first water, and, at the same time, collect on the cylinders the impurities, such as lime, magnesia, iron, and all such elements, which tend to destroy the purity of salt, while those impurities which do not adhere to the cylinder or cylinders are precipitated to the water; second, in a rotary evaporating steam-cylinder revolving in or over a suitable reservoir heated by steam; third, forming an aperture in a hot air or water cylinder for the purpose of discharging condensed steam; fourth, locating above or providing a rotating steam or hot-air cylinder or cylinders with dripping-pipes; fifth, the employment of a knife or scraper, movable or stationary, for scraping off any substance that may adhere to the steam or hot-air cylinder; and, sixth, the general combination of a rotating steam or hot-air cylinder or steam-chamber with a reservoir and a scraper or knife, all of which will hereinafter more fully be described.

I prepare a steam-boiler of desired capacity, and connect the same with a steam or hot-air chamber or cylinder, either dressed or undressed, which rotates, and is partly immersed in the salt-water. This chamber or cylinder is provided with dripping-pipes to further economize heat, thus uniting both the solar and artificial mode of evaporation. In this connection I employ a scraper or knife, or any other suitable device, which acts upon the periphery of the hollow steam chamber or cylinder to clean off the residuum from the evaporating surface, dry or otherwise, as desired. One or more hollow steam or hot-air chambers or cylinders may be used. The first series may be heated with the escaping steam or heat escaping from the fire-flue, or both the escaping steam from the principal cylinders and heat from the fire-flue. By this method the brine is partially evaporated by the first cylinder or cylinders sufficient to precipitate the lime, magnesia, and other impurities, while by the use of scrapers or knives all impurities that adhere to the surface of the steam or hot-air heated cylinders are removed in sufficient quantities to precipitate them to the bottom of the evaporating-pan or reservoir. Then above all this sediment the brine may be drawn to the second series of chambers or cylinders, where the evaporation may be completed, and the dry salt or other residuum of liquid may be removed from the surface by scraping with a knife or other suitable device, and thus complete the manufacture of salt without the danger of overheating or incrustation, the impediment always present in the manufacture of salt.

*General Description.*

In the drawing, A may represent an evaporating-pan; C, a rotating steam or hot-air cylinder; M M, the stuffing-boxes; D, the steam-passages; H, opening in rotating or hot-air cylinder; E E, the dripping-pipes; F F, brackets supporting the pipes and hollow cylinder; and G, the movable or stationary scraper or knife.

A is the evaporating-pan or reservoir formed of suitable metal and of any desired shape, but preferably of a square formation, and so arranged as to admit the ingress of brine. Formed with this evaporating-pan or reservoir, or firmly secured to it, by bolts or screws *a a a a*, are brackets or pedestals F, which are provided with openings *b b*, forming bearings for the journals for a hollow steam or hot-air cylinder, C, hereinafter mentioned. *b b* represent a series of openings formed in the top part of the bracket or pedestals F, which form bearings or supports for a series of dripping-pipes, E E E E. The part of the bracket or pedestals forming the bearings for the journals of the hollow steam cylinder may be may be made much stouter than the top part supporting the dripping-pipes, so as to reliably support the cylinder C. C is a hollow steam or hot-air metallic cylinder formed with journals having their bearings in the bracket or pedestal F, and which rotates in or over the reservoir or evaporating-pan A, so that its periphery touches the salt-water. The journals of the hollow cylinder are provided with screw-threads at either end so as to receive stuffing-boxes N N, which are likewise provided with screw-threads, and operate together as a male and female screw. D is a passage formed in the stuffing-boxes and journals of the cylinder, designed to allow steam, hot air, or water to pass from a steam-boiler into or through the hollow cylinder C. This cylinder C rotates upon its journals in or over the reservoir or evaporating-pan A, and is, preferably, formed or provided with an opening or outlet for the purpose of discharging the water collected therein, owing to condensation of steam. E E E are hollow dripping-pipes formed with a suitable slot or opening extending more or less the entire length of the pipes, as fully shown in Fig. 4. These pipes have their bearings in the bracket or pedestal F, and are arranged around the top part or surface of the hollow steam-cylinder, out of immediate contact with said cylinder, in such a manner as to drip the liquid from a reservoir evenly and at proper distances upon the rotating evaporating-cylinder C. G is a movable or stationary knife or scraper, one or more in number, as may be desired, arranged in an inclined position, its edge bearing upon the circumference or periphery of the revolving cylinder, and is designed to scrape from the surface of the said cylinder whatever substance or impurity may be collected thereon. This knife or scraper may either be formed with the evaporating-pan attached to it by screws or bolts, or may be hinged or hung loosely upon arms *p p* formed or otherwise secured to the sides or framing of the pan.

Having thus described my invention, what I claim as new, and desire to secure by Letters Patent, is—

1. The process or method of making salt by subjecting or exposing salt-water to the periphery or surface of one or more rotating cylinders heated by steam, hot air, or heated water, substantially as described, for the purpose set forth.

2. The hollow dripping-pipes formed with a slot or opening, and operating substantially as described.

3. The hollow rotary evaporating steam chamber or cylinder, provided with an opening, H, for the passage of condensed steam, substantially as described, for the purpose set forth.

4. A hollow rotary steam or hot-air evaporating-cylinder, in combination with an evaporating-pan or reservoir, when the periphery of said cylinder touches the salt-water, substantially as described.

5. The combination of a knife or scraper with a dressed or undressed revolving steam-cylinder, substantially as set forth.

6. The dripping-pipes E E, steam chamber or cylinder C, in combination with the evaporating-pan or reservoir A and the knife G, substantially as described.

To the above I have signed my name this 16th day of March, A. D. 1871.

SAML. D. GILSON.

Witnesses:
JAMES L. NORRIS,
W. J. PEYTON.